United States Patent [19]

Zuckerman et al.

[11] Patent Number: 4,526,306
[45] Date of Patent: Jul. 2, 1985

[54] GARMENT-SHAPING HANGER

[75] Inventors: Jack M. Zuckerman, Forest Hills; John Warmath, Brooklyn, both of N.Y.

[73] Assignee: Cut Rate Plastic Hangers, Inc., Forest Hills, N.Y.

[21] Appl. No.: 14,053

[22] Filed: Feb. 22, 1979

[51] Int. Cl.³ .......................................... A47J 51/096
[52] U.S. Cl. ..................................................... 223/88
[58] Field of Search ....................... 223/85, 88, 92, 95, 223/68; D6/247, 248, 249, 250, 256

[56] References Cited

U.S. PATENT DOCUMENTS

| | | | |
|---|---|---|---|
| 599,244 | 2/1898 | Larsen | 223/88 |
| 777,354 | 12/1904 | Sinsheimer | D6/249 |
| 1,104,099 | 7/1914 | Brenner | 223/85 |
| 1,563,659 | 12/1925 | Riordan et al. | 223/68 |
| 1,591,786 | 7/1926 | Simpson | 223/68 |
| 1,839,605 | 1/1932 | Siemen et al. | 223/92 |
| 2,259,370 | 10/1941 | Fitzgerald | 223/68 |
| 2,666,559 | 1/1954 | Wexler et al. | 223/68 |
| 2,998,903 | 9/1961 | Day | 223/68 |
| 3,207,392 | 9/1965 | Ericson | 223/85 |
| 3,737,079 | 6/1973 | Bliss | 223/68 |
| 4,109,838 | 8/1978 | Durek | 223/92 |
| 4,424,922 | 1/1984 | Zuckerman et al. | 223/88 |

FOREIGN PATENT DOCUMENTS

| | | | |
|---|---|---|---|
| 952530 | 3/1964 | United Kingdom | 223/85 |
| 1300225 | 12/1972 | United Kingdom | 223/88 |

Primary Examiner—Werner H. Schroeder
Assistant Examiner—Andrew M. Falik
Attorney, Agent, or Firm—Bauer & Amer

[57] ABSTRACT

A garment hanger for shaping the front and rear of a garment supported thereon by garment shaping sections that are connected in separated spaced relation to each other.

7 Claims, 15 Drawing Figures

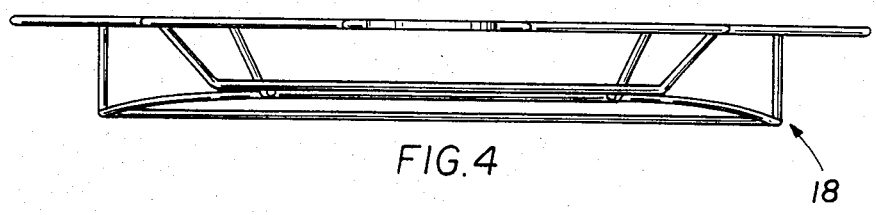
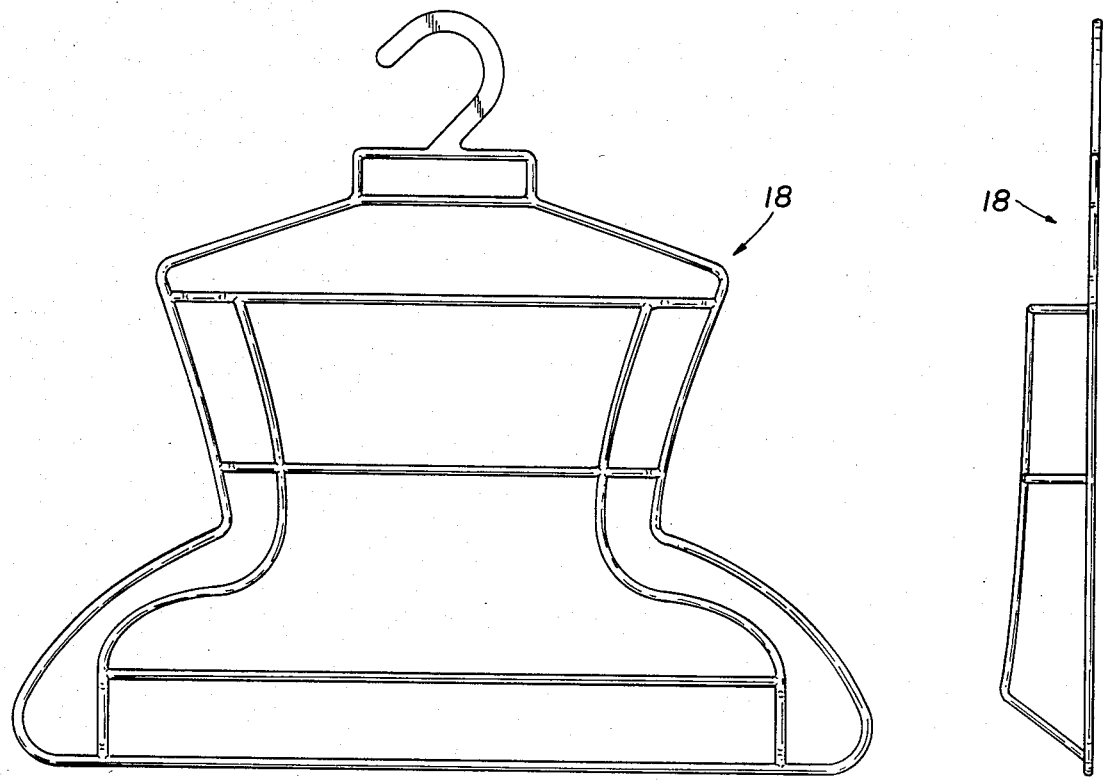
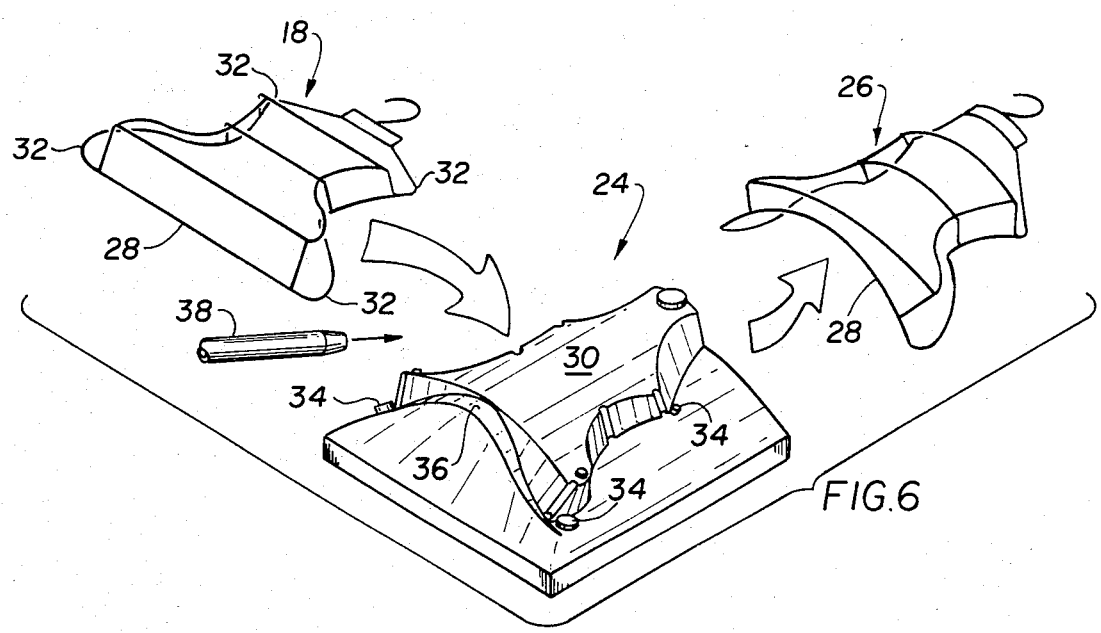

GARMENT-SHAPING HANGER

The present invention generally relates to improvements in producing plastic hangers of the type used for garment display, as well as to noteworthy shapes in such hangers for this specific end use, and more particularly, as far as method aspects are concerned, to a method of producing comparatively large-sized and varied shaped hangers, and thus hangers that are particularly suited to imparting shape to garments displayed thereon, without expensive and complex molds, and without the usual attendant difficulties of making and operating with such molds.

As generally understood, plastic hangers of the type used in point-of-sales displays, are advantageously economically mass-produced by using injection molding equipment or machinery. There are, however, limits on what can be injected molded that are imposed by such factors as mold design and size, flow problems in the injected plastic, and similar engineering parameters. Underlying the present invention is the recognition that injection molding, given the limitations referred to, can nevertheless provide an effective work-in-process or initial shape that is then readily imparted with a finalized shape, that in numerous respects provides a hanger, heretofore not readily attainable, that is significantly suited for displaying garments for retail sale. The referred to contemplated finalized shape is defined by both size and configuration variation, and thus there is actually afforded an opportunity to make a selection from a wide range of possible finalized shapes that particular hanger shape most suitable for displaying a particular garment under consideration. Since the variation in design of garments is considerable, the shape and size of hangers suitable for garment display is correspondingly considerable, and this undoubtedly accounts for the presently ineffective methods now known and used in producing plastic display hangers, and the dearth of effective display hanger shapes.

Broadly, it is an object of the present invention to, both economically and with simplified equipment, provide multi-shaped garment display hangers according to an improved commercially acceptable method overcoming the foregoing and other shortcomings of the prior art. Specifically, it is an object to utilize to fullest advantage the production capability of injection molding, and yet achieve more complex hanger shapes than this molding technique is characteristically capable, said shapes contributing to effective and significantly enhanced point-of-sales display of garments placed thereon.

In accordance with method aspects of the within invention, and demonstrating objects and advantages thereof, there is initially made available by the injection molding of suitable deformable plastic material, preferably polypropylene, a work-in-process structure and, while said plastic is in said deformable condition, it is contemplated removing said structure from the injection apparatus molds. The removed structure is then stretched, using an appropriate form or external mold, into a finalized shape selected specifically having in mind garment-display service of the hanger. Thus the resulting hanger is effectively embodied with an enhanced shape for displaying a garment thereon, although its shape, i.e. size and configuration, could not readily be produced only by injection molding.

The above brief description, as well as further objects, features, and advantages of the present invention, will be more fully appreciated by reference to the following detailed description of the within inventive method and presently preferred but nonetheless illustrative embodiments of hangers produced in accordance with said method, when taken in conjunction with the accompanying drawings, wherein:

FIG. 1 is a perspective view of an initial or aptly characterized work-in-process hanger structure demonstrating method and product aspects of the within invention;

FIG. 2 diagrammatically illustrates the injection molding of said FIG. 1 hanger structure;

FIGS. 3, 4 and 5 illustrate further structural details of said FIG. 1 hanger, FIG. 3 more particularly being a front elevational view thereof, FIG. 4 a plan view, and FIG. 5 a side elevational view thereof;

FIG. 6 diagrammatically illustrates how said initial or work-in-process hanger structure is modified into a selected finalized shape advantageously adapting said hanger for use in displaying a garment;

Figure 13:
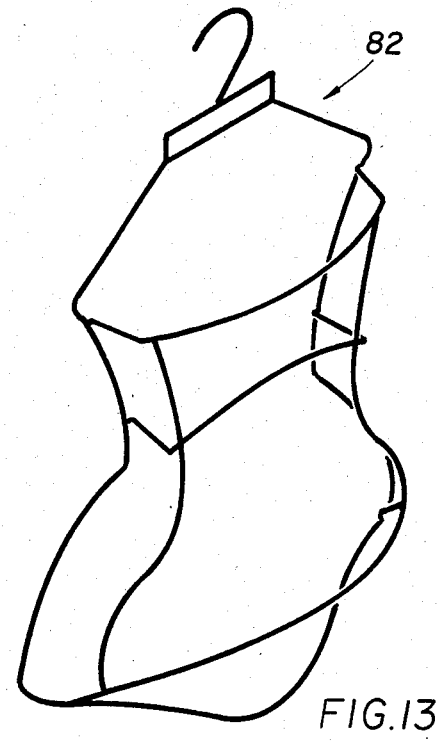
Figure 14:
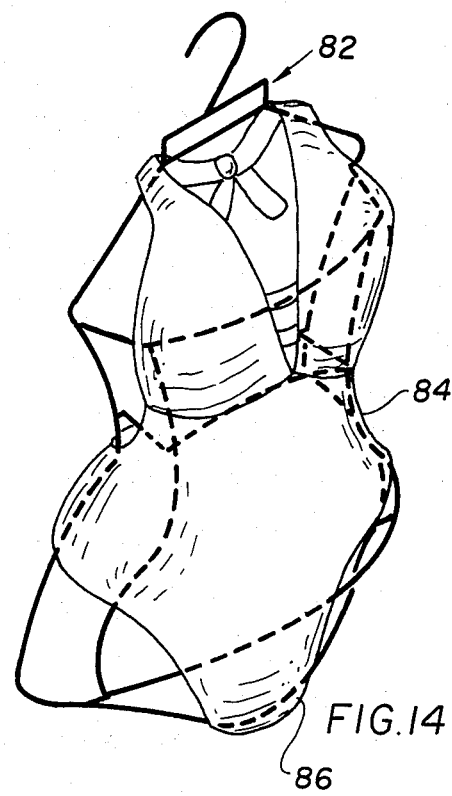
Figure 15:
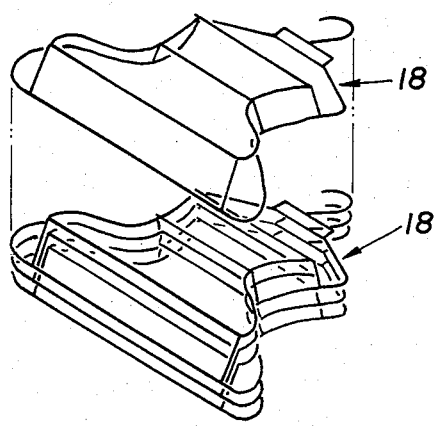

FIGS. 13 and 14 are perspective views of an additional selected finalized shape for a garment-shaping hanger according to the present invention, FIG. 13 being an isolated view of the hanger per se, and FIG. 14 illustrating the hanger with an appropriate garment displayed thereon; and Remaining FIG. 15 is a perspective view illustrating how identically constructed hangers according to the present invention are adapted to nest or stack with each other.

METHOD

Figures 10, 11:
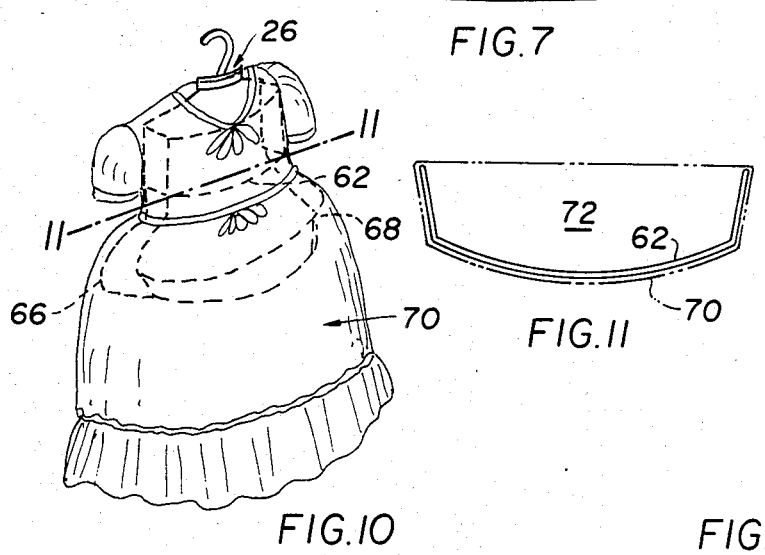
FIG. 10 is a perspective view illustrating typical use of the within hanger for garment-shaping service.
FIG. 11 is a simplified sectional view along the plane of reference line 11—11 of FIG. 10, illustrating how the within hanger fills the internal volume of a garment and thus advantageously displays it in a shaped condition.
Figure 12:
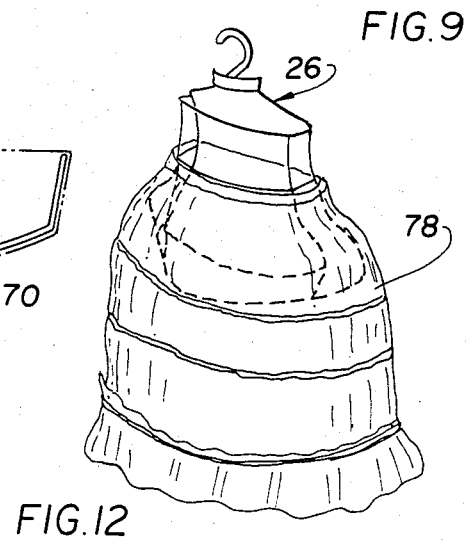
FIG. 12 is a further perspective illustration of how a garment is advantageously displayed on the within hanger.

The present invention is concerned with plastic hangers of the type that are advantageously used to impart shape to garments draped or placed on the hanger, and thus are useful in making the shaped garments more appealing to a prospective customer. The hangers referred to, in their garment-shaping service also as just referred to, are illustrated in FIGS. 10 and 12, and also in FIGS. 13 and 14. By this preliminary reference, it is intended to illustrate that there are of course a wide variety of garments that could be effectively displayed with a hanger-imparted shape, such as a full skirted dress of FIG. 10, or a full skirted petticoat of FIG. 12, or a bathing suit of FIG. 14, provided of course that each hanger used for these diverse garments is itself of an appropriate shape that is suitable for the shaping of the garment. In accordance with the method aspects of the present invention, as will now be described, there can be provided a wide variety of hangers in finalized shapes that are suitable for point-of-sales display, and yet the costs of manufacturing and of the additional effort required to produce all these diverse shapes is but slightly more than that involved in the economical mass production of plastic hangers by the well known conventional injection molding technique.

Figures 1, 2:
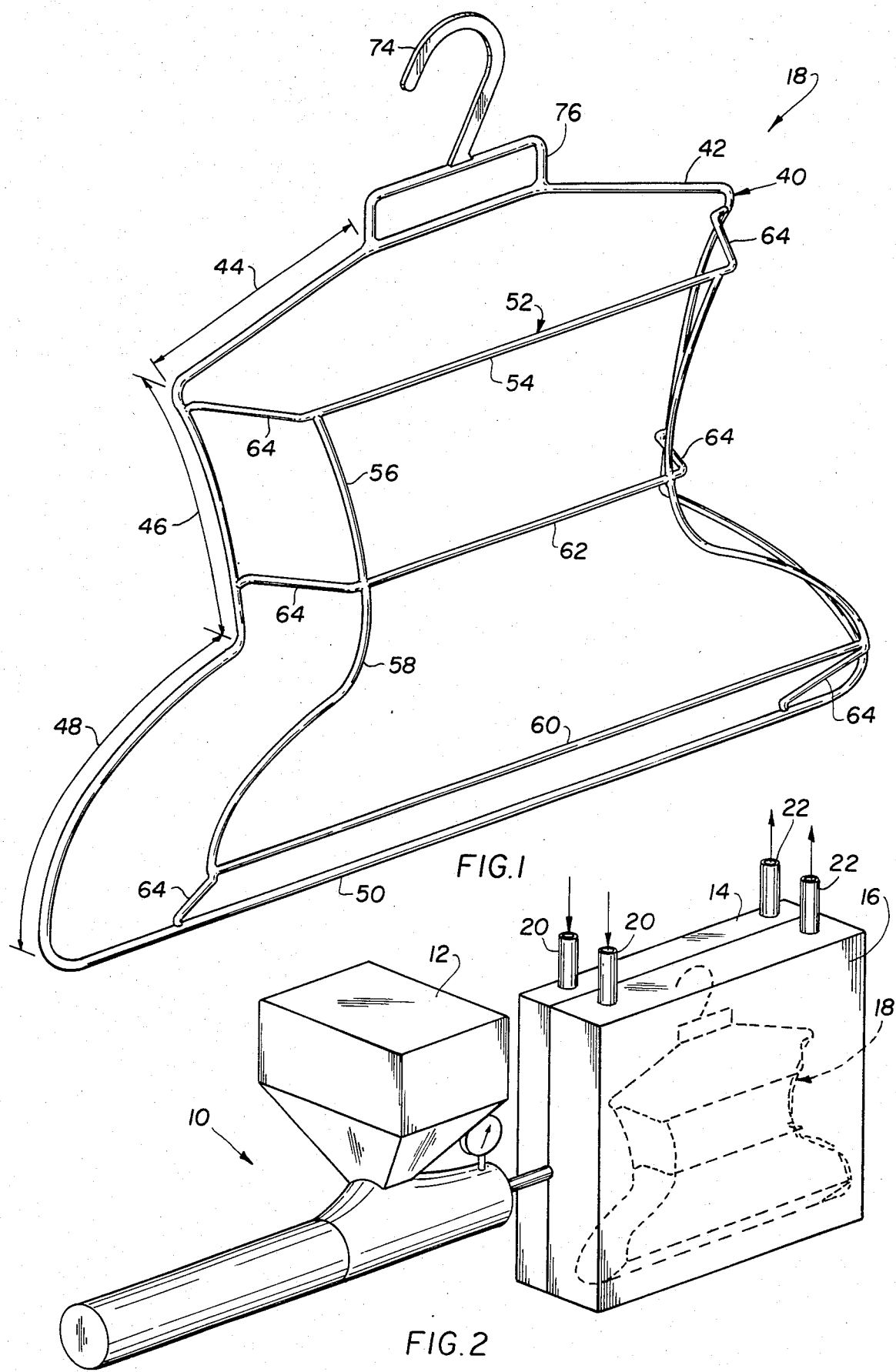

The within inventive method is best understood from a progressive examination of FIGS. 2 and 6, in addition to inspection of the remaining figures which illustrate product aspects of the various plastic hangers which result from such method. More particularly, in FIG. 2 it will be understood that there is illustrated a conventional injection molding apparatus, generally designated 10, such as might be provided by Reed Prentice or other such manufacturer. Apparatus 10, as generally understood, is effective in injecting plastic, in this case preferably polypropylene, supplied from a hopper 12 into molding cavities provided at the interface of two cooperating molds 14 and 16, which molding cavities have an appropriate configuration that when filled with the molten plastic produce the injection molded article 20 which, in this instance, is a preliminary hanger shape, generally designated 18, constructed as illustrated and as will be subsequently described herein in detail.

At this point in the description it is to be noted that hanger 18 is readily provided by injection molding, in that the struts of which the same is comprised, their interconnection, and all other physical aspects, are well within the design expertise of one versed in the injection molding art. It is further to be readily understood that the molded product 18 is well within the capacity of the molding apparatus 10 and the machined molds 14 and 16 to produce.

In the diagrammatic illustration of the injection molding production of hanger 18, inlet and outlet conduit connections to the mold are noted respectively by the reference numerals 20 and 22. Such structure is conventionally a part of this equipment and is conventionally used for directing cooling fluid in heat exchange relation to the hanger 18 to promote the curing of the plastic construction material thereof. Naturally when the plastic is cured and cooled, the shape of the hanger 18 is finalized. In the practice of the method of the present invention, however, any significant use of the cooling system of the molds 14 and 16, as represented by the inlet and outlet conduits 20 and 22, respectively, is dispensed with. Instead, it is proposed in accordance with the present invention that the molded hanger shape 18 will be released by parting movement of the molds 14 and 16 while it is still in a deformable and plastic condition and will be worked further. That is, the structure 18 is treated only as a preliminary or a work-in-process structure in relation to what will be its finalized shape when used for garment-shaping service, as previously noted in the exemplary situations depicted in FIGS. 10, 12 and 14.

More particularly, and continuing with the description of the method aspects of the present invention, and with particular reference to FIG. 6, it will be understood that the work-in-process hanger structure 18 while still in a plastic or deformable condition, is removed from the molding cavity of molds 14 and 16 and transported to an appropriate work station, generally designated 24, at which the deformable plastic of structure 18 is worked into another shape that is more suitable and appropriate for the garment-shaping service that is destined for the hanger. Such finalized shape, generally designated 26 and to be described in detail subsequently herein, will be understood to be the result of stretching the structure 18 and thus enlarging it in size and, even more important, also curving it in strategic locations, thereby embodying the finalized version of the display hanger 26 with attributes that contribute to its ability to appropriately shape garments displayed thereon. Illustrating but one of several typical modifications that are contemplated at work station 24 is the essentially straight condition of the strut designated 28 of the initial hanger shape 18 and the significantly stretched out and curved condition of the same strut in the finalized hanger structure 26.

In connection with the aforesaid, it is one of the underlying aspects of the present invention to have recognized that there are limitations in shape and configuration of hanger structures that can be readily produced by injection molding, but that a selected injection molded shape, treated as a work-in-process structure can then be effectively stretched on an external mold, such as mold 30 at work station 24, into a more effective shape for garment-shaping service. Stated another way, while the finalized shape of hanger structure 26 might be too complex to be readily reproduced by injection molding, it will be understood to be well within a wide variety of shapes that can be readily produced on an external mold 30 starting with an initial structure, such as structure 18, that requires only slight modification of a stretching nature.

The shaping of deformable plastic articles by stretching the same over an external mold should be readily understandable to one well versed in the art and therefore need not be explained herein in any extensive detail. Briefly, the initial hanger structure 18 is readily attached, as at locations individually and collectively designated 32, to attaching structure 34 of the external mold 30, which has the desired effect of stretching the hanger structure 18 over, and thereby forcing it to conform, to the shape or body of the external mold 30. In this way, for example, the rise represented by the surface 36 at the base of the mold 30, which is against deformable plastic strut 28 in initial hanger structure 18, thus effectively induces a conforming shape therein, as illustrated by the curved nature of strut 18 in the finalized hanger shape 26. While initial hanger structure 18 is stretched over the mold 30, pressure air from an appropriate source and delivered through a hand directed nozzle 38 is advantageously directed against the hanger structure 18, thereby causing accelerated cooling of the plastic material and the expedited attainment of the finalized shape of hanger 26 as actually used in the display-shaping of garments.

From the description thus far provided in specific connection with FIGS. 2 and 6 it should be readily appreciated that the within inventive method is a novel combination of injection molding of an initial basic shape, and the subsequent modification of the same by a stretching procedure, to thereby produce a finalized hanger shape that is particularly suitable and advantageously adapted to impart shape to a garment at a point-of-sales display. Moreover, although only a single stretching of shaping mold has been illustrated in FIG. 6 for the work-in-process injection molded shape, it will of course be understood that numerous other hanger-stretching molds are contemplated as being useful in the practice of the within invention and, of course, it will be used in order to produce the wide variety of shapes of display hangers that can effectively be used to satisfy the display requirements of the diverse types of garments under consideration.

IMPROVED GARMENT-SHAPING HANGER EMBDOIMENTS

Although the previously noted basic work-in-process hanger structure 18 of FIGS. 1, 3-5, is not intended to be used per se in a point-of-sales display, the contribution thereof, as will now be described, readily lends itself to being modified into noteworthy commercial finalized hanger shapes, such as the previously noted final shape 26. To this end, hanger shape 18 includes a first body section 40 which essentially consists of a strut 42 that extends about the periphery of the section 40 and embodies it with the peripheral shape that characterizes said body section. Thus, strut 42 has length portions 44 in a shoulder area, opposite length portions 46 defining the sides of said section (only one of which is shown), an outwardly diverging flaring length portion 48 coincident with the hip area of the garment displayed on the hanger, and finally a lower horizontally oriented strut 50 across the bottom completing said body section 40.

Initial hanger structure 18 also includes a corresponding shaped, but smaller-sized second body section 52. That is, this body section also includes an upper horizontally oriented strut 54 in a shoulder area, side and hip-simulating struts 56, 58, respectively, and a bottom strut 60. An additional strut 62 is provided in the medial area of the second body section 52 not only to supplement the structural rigidity of the section, but also that of the first body section 42. That is, the two body sections, as will now be explained, are joined together into a unitary structure. Thus, as far as structural stability is concerned, the second body section 52 in the unitary structure serves the function as the center for the first body section 40, and thus effectively maintains against inadvertent collapse the peripheral shaped member or strut 42 of said first body section 40.

In accordance with the present invention, the two body sections 40 and 52 are joined into a unitary structure in a spaced relation to each other wherein, more particularly, the first body section 40 is rearwardly disposed and said body section 52 is forwardly disposed. As a result, in the finalized shape produced from the work-in-process hanger 18, body section 40 is in an advantageous strategic position to make contact with, and thus provide shape to, the rear of the garment displayed thereon, while the front body section 52 is advantageously located to impart a shape to the front of the garment. To achieve the aforesaid spaced relation of the body sections 40 and 52, and also to make a unitary structure thereof, the two sections are joined to each other by interconnecting struts, individually and collectively designated 64.

At this point in the description it is propitious to note, as illustrated in FIG. 15, that the larger size of the first body section 40, and the fact that it is unobstructed by any strut extending transversely across the opening bounded by the peripherally shaped member or strut 42, contributes to the projecting of the smaller sized body section 52 therein, and thus achieving a nesting or stacking of similarly constructed hanger shapes 18. As a result of this stacking, there is of course considerably less space required for the storing of inventory of the basic shapes 18 preparatory to converting these shapes into selected finalized garment-shaping hangers.

In FIGS. 3, 4 and 5, the individual struts have intentionally not been designated by reference numerals so as not to obscure the cooperative operative relation that exists between the two body sections 40 and 52, as hereinbefore described. That is, as illustrated in these figures and has been specifically denoted in FIG. 5, body section 52 is held forwardly by the interconnecting struts 64 from body section 40 by at least a distance denoted by the reference numeral 66. With experimental models, favorable results have been obtained using polypropylene in which the struts are approximately $\frac{3}{8}$ inches wide, wherein the height of body section 52 as measured from strut 54 to strut 60 is approximately $6\frac{1}{2}$ inches, and the spaced relation between the body sections, or distance 66, is approximately 1 inch. Further, by favorable results is meant that the initial or work-in-process hanger structure 18 with the dimensions as just described is readily and economically produced by injection molding, and such shape readily lends itself to being modified, by being stretched over an external mold as hereinbefore described, into a great variety of finalized hanger shapes, as exemplified by hanger 26, such finalized shapes being particularly suitable for displaying garments with shape in a point-of-sales display.

Figure 8:
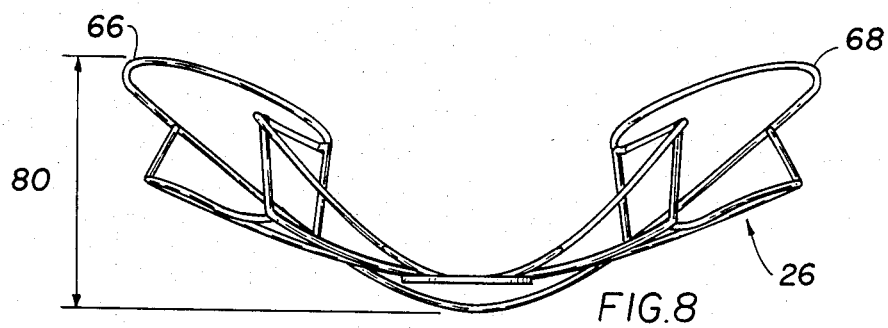
FIGS. 7, 8 and 9 are views similar to FIGS. 3-5, respectively, and illustrate further structural details of the within garment-shaping hanger hereof in its finalized shape specifically adapted for this function, said FIG. 7 being a front elevational view, FIG. 8 a plan view, and FIG. 9 a side elevational view thereof.
Figures 7, 9:
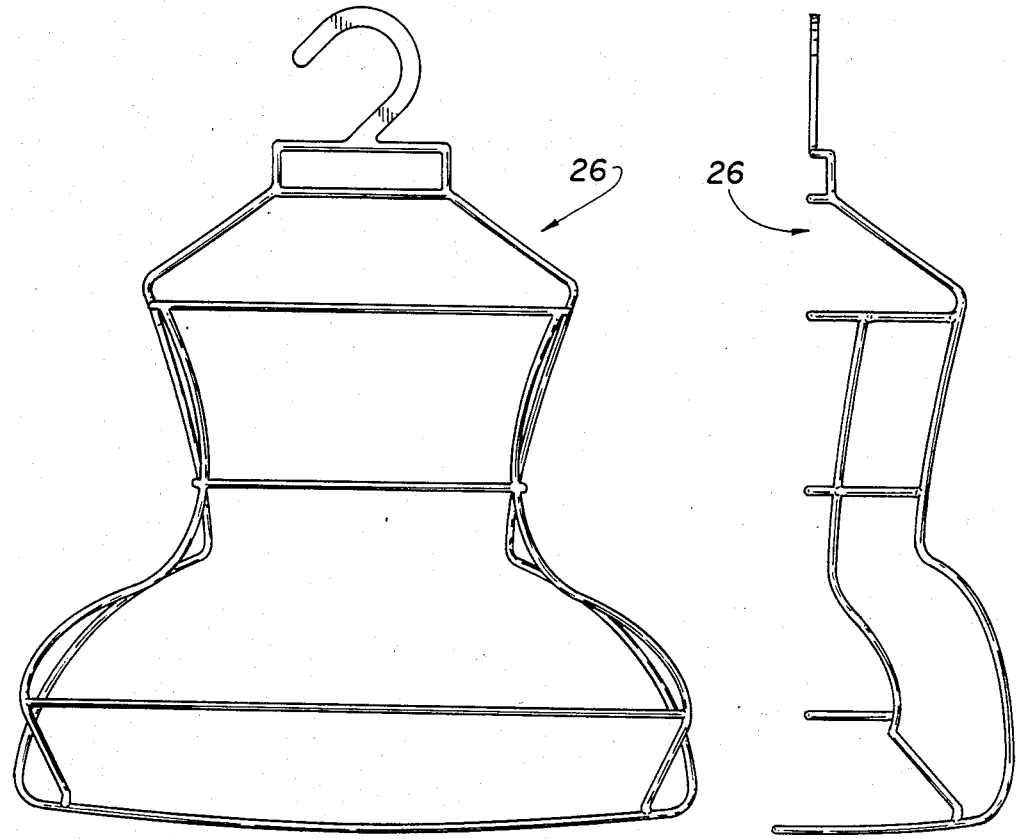

For completeness' sake, reference should now be had to FIGS. 7-9 which illustrate the structural details of said finalized hanger shape 26 as produced from the basic or initial hanger shape 18. In FIGS. 7-9, respectively, the same reference numerals are used to designate the same structural features already described in connection with FIGS. 1 and 3-5, respectively. Thus, the finalized hanger shape 26 is comprised of body section 40 and a body section 52 interconnected in spaced relation to each other by the struts 64. However, as illustrated in the plan view of FIG. 8, both the sections 40 and 52 are bent out of their initial flat plane and thus accentuate a forwardly projecting curve in the transversely oriented struts 54, 62 and 60. This modification also accentuates the rearwardly disposed positions of the two bottom corners 66 and 68 of the rear body section 40. As a result, and as is perhaps best illustated in FIGS. 10 and 11, when a full skirted dress 70 is placed in display position on the hanger 26, the forwardly projected struts of the body section 52 are pressed into shaping contact against the front of the garment, and the corners 66 and 68 of the rear section 40 against the rear of the garment, thereby spreading and filling the internal volume 72 of said garment. Stated another way, the increased volume bounded by the modified finalized hanger shape 26, as compared with the lesser volume bounded by the initial hanger shape 18, readily adapts the finalized shape for garment-display service far beyond what was possible for the initial injection molded version.

To demonstrate how extensive the work-in-process hanger shape 18 can be modified in producing a more commercial finalized version thereof, it will be noted in the side elevational view of FIG. 9 that the upper portion of body section 40, or more particularly the length portion 44 thereof, can be bent to an extreme angle forwardly so that the hanger or hook 74 as well as a name plate opening 76 will lie in the vertical plane of the body section 52.

Still referring to FIG. 9, it is also worth noting that since most of the garments that will be displayed on the hanger 26 are intended for females, that the uppermost strut 54 of the front body section 52 is located coincident with the bodice area of the garment, and thus when imparted with an appropriate shape, is very effective in correspondingly imparting a life-like appearance to the garment being displayed.

FIG. 12 illustrates how the outwardly flaring hip-simulating struts 48, 58 of the joined together body sections provide lateral dimension to a typical full-skirted petticoat 78 draped over the display hanger 26. The aforesaid hip-simulating shape is further enhanced by the rearwardly disposed position that is effectively provided the two corners 66 and 68 of the rear body section 40, particularly in conjunction with the opposite direction projection that is imparted to the middle strut 62 of the front body section 52. That is, the expanse denoted by the reference numeral 80 is very effective in providing a life-simulating appearance in the hip or lower torso region of a garment displayed on the hanger 26, in that it adds to the hip-simulation that results from the struts extending laterally on either side of the vertical axis of the hanger.

Reference is now made to FIGS. 13 and 14 and still another embodiment of a finalized hanger shape that is particularly worth noting, such shape being generally designated 82 therein. Hanger shape 82 is particularly adapted for display of a bathing suit 84. This garment has a depending crotch area 86 which heretofore could not be effectively displayed with any internal shaping hanger. In accordance with product aspects of the present invention, however, bottom strut 50 of the rear body section 40 is merely bent into a bowed shape in depending relation below strut 60 of the front body section 52, the stretching thereof being readily performed over an appropriate external mold, as exemplified by the mold and description of the use thereof provided previously in connection with FIG. 6. As will be readily appreciated, the relative spaced relation between the struts 50 and 60 is correspondingly readily adapted to impart an appropriate shape to the depending area 86 of the bathing suit 84.

From the foregoing it should be readily appreciated that numerous finalized shapes, exemplified by the shapes 26 and 82, can be readily produced by stretching the initial injection molded basic shape 18 over an external mold, and wherein the stretching thereof increases the size and thus the ability of the finalized hanger to fill an internal volume and thus impart shape against the inside of the front and rear panels, in the upper and lower torso areas, of a garment mounted in display position on the finalized version of the hanger. Moreover, with regard to method aspects of the invention, it should be readily appreciated that the hanger in a selected shape as actually used for displaying garments is of such a complex nature that it would be difficult to produce by injection molding, and therefore the combined techniques as contemplated by the within method represents a significant contribution to the art of producing inexpensive yet highly effective garment-displaying plastic hangers.

A latitude of modification, change and substitution is intended in the foregoing disclosure and in some instances some method or product features of the invention will be employed without a corresponding use of other features. Accordingly, it is appropriate that the appended claims be construed broadly and in a manner consistent with the spirit and scope of the invention herein.

What is claimed is:

1. A garment-shaping plastic hanger comprising a first body section adapted to have an operative position in shaping contact against the rear of a garment being diplayed on said hanger, a second body section adapted to have an operative position in shaping contact against the front of said garment, and interconnecting plastic struts operatively effective both to position said two body sections in a separated spaced relation generally parallel to each other and to join said sections into a unitary structure, said first and second body sections being respectively rearwardly and forwardly disposed in said unitary structure, whereby each body section is advantageously located adjacent the respective rear and front of the garment to be shaped thereby, said front body section is defined by a peripherally shaped member having an open internal volume, and said second body section is defined by a corresponding smaller-sized peripherally shaped member having plastic struts connected transversely thereof, whereby said plastic struts minimize inadvertent distortion of the shape of the larger as well as of the smaller of said members while permitting stacking of similarly constructed hangers by the interfitting of each said smaller-sized member in said larger member.

2. A garment-shaping plastic hanger as claimed in claim 1, wherein the construction material of said shaped members is a deformable plastic, and each said member includes a transversely oriented strut in adjacent cooperating position to a similarly oriented strut in the other member and in a depending location in said unitary structure, whereby said cooperating pair of transverse struts is adapted to be further shaped by deformation for imparting shape to a lower torso area of a garment displayed thereon.

3. A garment-shaping plastic hanger as claimed in claim 2, wherein each said member further includes an additional transversely oriented strut in adjacent cooperating position to a similarly oriented strut in the other member and in an upper location in said unitary structure, whereby said cooperating pair of transverse struts is adapted to be further shaped by deformation for imparting shape to an upper torso area of a garment displayed thereon.

4. A garment-shaping plastic hanger comprising a first body section defined by a peripherally shaped member including spaced apart upper and lower struts bounding an open volume therebetween and adapted to have an operative position in shaping contact against the rear of a garment being displayed on said hanger, a second body section defined by a corresponding smaller-sized peripherally shaped member having plastic struts connected transversely thereof adjacent said upper and lower struts of said first body section, said cooperating pair of struts being adapted to be further shaped by deformation for respectively imparting shape to upper and lower torso areas of the garment displayed on said hanger, and interconnecting plastic struts operatively effective both to position said two body sections in a separated spaced relation to each other and to join said sections into a unitary structure, said first and second body sections being respectively rearwardly and forwardly disposed in said unitary structure, whereby each body section is advantageously located adjacent the respective rear and front of the garment to be shaped thereby wherein the opposite sides of said first and second body section members are provided with correspondingly outwardly divergent shapes in the lower portions thereof, whereby said sections are adapted to impart hip-simulating shape to a garment displayed thereon, said open volume of said first body member is of a selected larger size to accept in projected relation thereinto said second body section, whereby similarly constructed hangers are adapted to be stacked by the interfitting of said different sized body sections in each other.

5. A garment hanger comprising a first garment shaping section including hanger support means thereon, garment shoulder support means unitary with and extending laterally from opposite sides of said hanger support means and opposite side means depending from said shoulder support means, said shoulder support means and opposite side means defining a form for engagement with and shaping the corresponding shoulders and opposite sides of the inner rear surfaces of a garment supported on said garment hanger, a second garment shaping section including a top and opposite side means, said top and opposite side means of said second section being formed unitary with each other such that said opposite side means depend from the opposite sides of said top so that said opposite side means and said top cooperate with each other to define a garment bosom shaping form for engagement with and the shaping of the corresponding inner front bosom and side surfaces of a garment supported on said garment hanger, each of said first and second sections being relatively spaced generally parallel from each other, and struts connected between said first and second garment shaping sections to relatively space said sections from each other and to retain the relative spacing of said sections on said garment hanger.

6. A garment hanger as in claim 5, said garment shaping sections each having means unitary therewith to form an integral part thereof to support said sides in said opposed spaced relation such that each said section has a substantially peripherally enclosed shape.

7. A garment hanger as in claim 6, the substantially peripherally enclosed shape of one of said garment shaping sections being smaller than that of the other of said garment shaping sections such that a garment hanger having similarly configured garment shaping sections may be stacked one on the other with the smaller section of each garment hanger fitting within the confines of the larger section of the next adjacently stacked garment hanger.

* * * * *